March 8, 1927. 1,620,193
F. COATES
NAIL
Filed Nov. 24, 1925
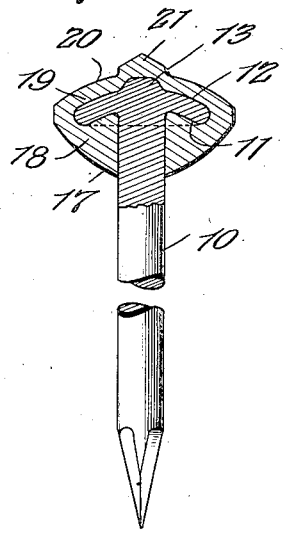
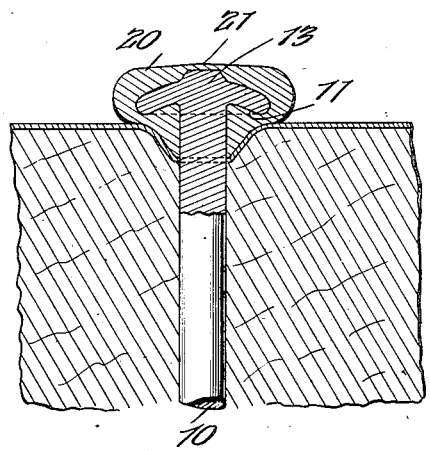
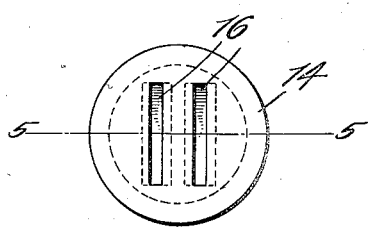
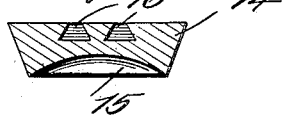
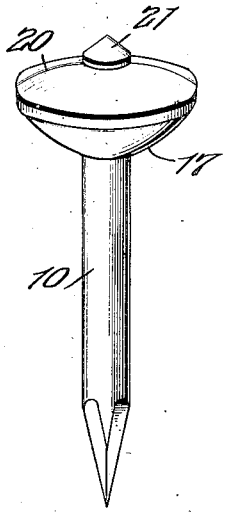
Inventor
FREDERICK COATES,
By
Attorney Patented Mar. 8, 1927.

1,620,193

UNITED STATES PATENT OFFICE.

FREDERICK COATES, OF CINCINNATI, OHIO.

NAIL.

Application filed November 24, 1925. Serial No. 71,137.

This invention relates to wire nails and has special reference to a plastic headed wire nail.

I am aware that wire nails have been made with heads of various kinds attached thereto, these being common in furniture tacks such as the small brass headed ornamental tacks. Also such tacks or nails have been made with leather heads and in some instances with rubber heads. Such nails as these are not, of course, suitable for use in exposed situations such as in holding tin roofs in place or are they suitable for use where the heads are exposed to corrosion, as in the securing of tank linings and the like.

One important object of the invention is to provide an improved form of wire nail having a plastic mass surrounding the nail head proper and closely gripping the shank of the nail just below the head.

Another important object of the invention is to provide a head of peculiar shape surrounded, as above set forth, by a plastic mass which is also of peculiar shape so that the the nail may be driven by blows on the plastic mass and yet without rupturing the mass or exposing any part of the nail head.

A third important object of the invention is to provide an improved form of nail head surrounded by a plastic mass, the head and mass being of such shape that when the nail is driven a completely watertight joint will be formed between the material through which the nail passes and said nail head.

A fourth important object of the invention is to provide an improved form of nail head including a head proper integral with the shank of the nail and a mass of lead swaged around such head to embrace the shank.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation partly in section of a nail constructed in accordance with this invention before driving.

Figure 2 is a sectional view, partly in elevation showing the form assumed by the nail when driven.

Figure 3 is a perspective view of a complete nail before driving.

Figure 4 is a plan view of one of the studs or buttons before being applied to the nail head proper.

Figure 5 is a section on the line 5—5 of Figure 4.

It is to be understood that mass, as above referred to, may indicate a very small quantity of the lead used and this mass will be referred to in its unapplied condition as a stud or button.

Wire nail heads as usually constructed are formed by upsetting one end of a length of wire in such manner as to produce either a flat or convex upper surface and a flat or frusto-conical under surface. In the present instance the head is formed in the usual manner by upsetting the portion of a length of wire and there is provided a shank 10 and a head having a convex under surface 11 and a concave upper surface 12 provided centrally with a boss 13, the purpose will presently be understood.

In the formation of this type of concavo-convex head dies may be employed such as are disclosed in my co-pending application filed the 1st day of December 1925 and bearing the Serial Number 72,479.

The studs or buttons used as they are before applying consist of slugs of lead or the like of the shape shown in Figure 4. These slugs have a frusto-conical body 14 provided with a concave under surface 15 and having a pair of dovetail slots 16 in their flat upper surface, these slots being to facilitate handling by gripping finger in automatic machinery. These studs or buttons are applied to the nail head proper by means of such dies as are shown in my copending application filed December 1st, 1925, and bearing the Serial No. 72,480. When so applied the nail head is surrounded by a plastic mass having a substantially segmento spherical under surface 17 forming a relatively large body 18 which extends up into the convex portion of the nail head and an upper portion 19 preferably of less thickness than the lower portion and having convex upper surface 20 provided centrally with a pointed or conical end boss 21 covering the boss 13. It has been found advisable in some instances to have the upper part of this stud of uniform thickness over the surface 12 of the nail head. It has also been found advisable to have the width of the boss 21 equal or slightly greater than the diameter of the boss 13.

By the swaging operation disclosed in my last mentioned copending application this stud closely grips all parts of the nail head proper and when driven the concave under surface of the nail prevents the material from crowding out and causes the under portion of the stud to assume a shape such as is shown in Figure 2. It is also to be noticed that practice disclosed that such a nail can be driven solidly, as shown in Figure 2, while still leaving a layer of the plastic material above the boss 13, the boss 21 and surface 20 being, when so driven, flattened out as shown in that figure.

It will be obvious that the exact form and proportions which are here shown may be varied without departing from the material principles involved. It is to be understood that I am not confining myself to these exact shapes and proportions but that I wish to protect all such forms that properly come within the scope claimed.

Having thus described the invention, what is claimed as new, is:

1. In combination, a nail having a shank and a head provided with a concave under surface forming a channel surrounding the shank, and a mass of plastic material surrounding the head and filling said channel.

2. In combination, a nail having a shank and a head provided with a concave under surface and a convex upper surface, the concavity of the head forming a channel surrounding the shank, and a mass of plastic material surrounding the head and filling the channel.

3. In combination, a nail having a shank and a head provided with a convex upper surface and a concave under surface forming a channel around the shank, said upper surface having a centrally disposed boss alined with the shank, and a mass of plastic material surrounding the head and filling the channel.

4. In combination, a nail having a shank and a head provided with a convex upper surface and a concave under surface forming a channel around the shank, said upper surface having a centrally disposed boss alined with the shank, and a mass of plastic material surrounding the head and filling the channel, the greater thickness of said plastic material being located below the head, said plastic material being provided with a boss alined with the first mentioned boss and forming means to receive the impact of a driving tool.

5. In combination, a nail having a shank and a head provided with a concave under surface and a convex upper surface, the concavity of the head forming a channel surrounding the shank, and a mass of plastic material surrounding the head and filling the channel, the greater thickness of said plastic material being located below the head, and the plastic material below the head having an under surface convex throughout its entire extent, said upper surface having a centrally disposed impact receiving boss.

In testimony whereof I affix my signature.

FREDERICK COATES.